United States Patent
Takahashi

(10) Patent No.: US 9,220,127 B2
(45) Date of Patent: Dec. 22, 2015

(54) WIRELESS NETWORK SYSTEM

(71) Applicant: YOKOGAWA ELECTRIC CORPORATION, Tokyo (JP)

(72) Inventor: Hiromi Takahashi, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 212 days.

(21) Appl. No.: 13/862,860

(22) Filed: Apr. 15, 2013

(65) Prior Publication Data

US 2013/0272200 A1    Oct. 17, 2013

(30) Foreign Application Priority Data

Apr. 16, 2012    (JP) ................................ 2012-092855

(51) Int. Cl.
| | |
|---|---|
| *H04W 4/00* | (2009.01) |
| *H04W 84/00* | (2009.01) |
| *H04L 29/06* | (2006.01) |
| *H04L 1/16* | (2006.01) |
| *H04W 84/18* | (2009.01) |
| *H04L 29/08* | (2006.01) |

(52) U.S. Cl.
CPC ............. *H04W 84/00* (2013.01); *H04L 1/1671* (2013.01); *H04L 69/18* (2013.01); *H04L 67/12* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 2002/0184410 A1* | 12/2002 | Apel et al. ........................ 710/5 |
| 2009/0010203 A1* | 1/2009 | Pratt et al. ..................... 370/328 |
| 2009/0260041 A1 | 10/2009 | McGinn et al. | |
| 2009/0316628 A1* | 12/2009 | Enns et al. .................... 370/328 |
| 2012/0230446 A1* | 9/2012 | Feng ............................. 375/272 |

FOREIGN PATENT DOCUMENTS

| | | |
|---|---|---|
| EP | 2146477 A1 | 1/2010 |
| JP | 2000-201200 A | 7/2000 |
| JP | 2008154087 A | 7/2008 |

OTHER PUBLICATIONS

Peter Welander, News and comment: Can WirelessHART and ISA100 converge?, Mar. 31, 2010, Control Engineering Process & Advanced Control Monthly eNewsletter.*
Yamamoto et al., "Field Wireless Solution Based on ISA100.11a to Innovate Instrumentation", Yokogawa Technical Report, Yokogawa Electric Corp., 2010, vol. 53, No. 2, pp. 7-12.
Yamamoto et al., "World's First Wireless Field Instruments Based on ISA100.11a", Yokogawa Technical Report, Yokogawa Electric Corp., 2010, vol. 53, No. 2, pp. 13-16.
Hasegawa et al., "Industrial Wireless Standardization—Scope and Implementation of ISA SP100 Standard", SICE Annual Conference, Sep. 13-18, 2011, pp. 2059-2064.
Extended European Search Report, dated Aug. 19, 2013, issued by the European Patent Office, in counterpart application No. 13163224.2.

* cited by examiner

*Primary Examiner* — Eunsook Choi
(74) *Attorney, Agent, or Firm* — Sughrue Mion, PLLC

(57) ABSTRACT

A wireless network system includes a plurality of devices operating on the basis of incompatible and different standards. At least one of the devices comprises a standard identifying module configured to identify standards on the basis of parameters inherent and different in the respective standards.

7 Claims, 6 Drawing Sheets

FIG. 3A

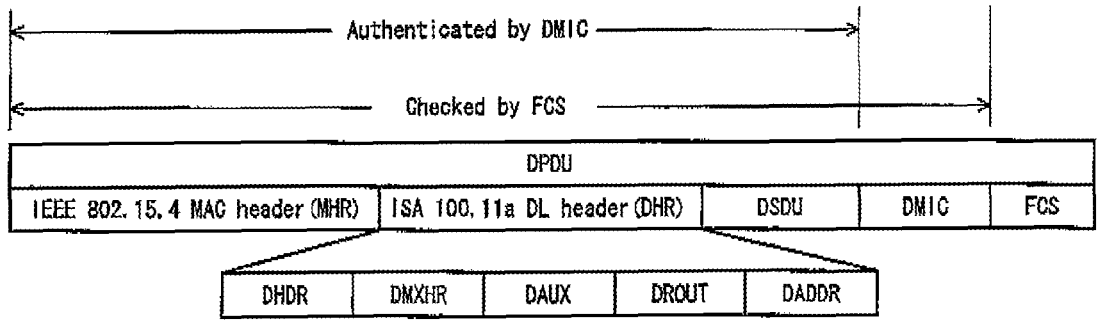

FIG. 3B

| octets | bits | | | | | | | |
|---|---|---|---|---|---|---|---|---|
| | 7 | 6 | 5 | 4 | 3 | 2 | 1 | 0 |
| 1 octet | ACK needed 0=NO ACK/NACK 1=ACK/NACK expected | Signal quality in ACK 0=no 1=yes | Request EUI-64 0=no 1=yes | Include DAUX 0=no 1=yes | Include show hopping offset 0=no 1=yes | Clock recipient 0=not DL clock recipient 1=DL Clock recipient | DL Version Always 01 | |

FIG. 3C

| octets | bits | | | | | | | |
|---|---|---|---|---|---|---|---|---|
| | 7 | 6 | 5 | 4 | 3 | 2 | 1 | 0 |
| 1 octet | ACK needed 0=NO ACK/NACK 1=ACK/NACK expected | Signal quality in ACK 0=no 1=yes | Request EUI-64 0=no 1=yes | Include DAUX 0=no 1=yes | Include show hopping offset 0=no 1=yes | Clock recipient 0=not DL clock recipient 1=DL Clock recipient | DL Version Always 00 | |

WIRELESS NETWORK SYSTEM

CROSS-REFERENCE TO RELATED APPLICATION(S)

The present application claims the benefit of priority of Japanese Patent Application No. 2012-092855, filed on Apr. 16, 2012. The disclosures of the application are incorporated herein by reference.

BACKGROUND

1. Technical Field

The present disclosure relates to a wireless network system, more particularly, to a wireless network system to which a plurality of devices operating on the basis of incompatible and different standards are connected and the plurality of devices operating on the basis of the respective standards can operate stably while being mixed.

2. Related Art

Process control systems in recent industrial automation are frequently configured using wireless field devices serving as a kind of wireless communication apparatus. As these wireless field devices, devices designed on the basis of the industrial automation wireless communication standard ISA100.11a drawn up by the ISA100 Committee of the International Society of Automation (ISA) and issued on September, 2009 are used, for example.

As a result that a related-art process control system is configured using wired field devices connected via cables, the process control system is affected by, for example:

1) Restriction on communication distance
2) Restriction on cable routing

Hence, sensors for measuring predetermined physical quantities serving as targets to be measured, such as temperature and flow rate, cannot be installed at optimal positions inside a plant, thereby causing a problem that the control accuracy of the process control system is degraded. The above-mentioned approach is taken to solve this problem.

FIG. 4 is a configuration explanatory view showing an example of a wireless network system having been used in the related art. In FIG. 4, a wireless network 1 is configured as a star-mesh topology composed of a plurality of I/O devices 2 to 6, routing devices 7 and 8, and a gateway 9.

The I/O devices 2 to 6 have the wireless communication functions specified in the ISA100.11a and include various sensors, such as differential pressure/pressure transmitters and temperature transmitters, and various final control elements, such as valves and positioners.

The routing devices 7 and 8, serving as advertisement routers, have functions for periodically issuing advertisement to neighboring devices, thereby transmitting route information and messages. These routing functions may be provided for sensors, such as differential pressure/pressure transmitters and temperature transmitters, and final control elements, such as valves and positioners, in some cases.

The gateway 9 has a function for connecting the wireless network 1 to a plant network 10 and also has a function for connecting the plurality of I/O devices 2 to 6 to a host application 11 provided for the plant network 10.

Furthermore, the gateway 9 can be equipped with a system manager function and a security manager function for the wireless network topology as necessary, thereby being capable of managing the system and security of the wireless network topology. Moreover, the gateway 9 can be equipped with a backbone router function for performing connection to wireless connection devices.

The host application 11 performs the setting of the routing devices 7 and 8 and the I/O devices 2 to 6, the diagnosis of devices, and the upgrade of firmware.

When attention is paid to wireless communication inside the wireless network 1 configured as shown in FIG. 4, the I/O devices 2 and 3 perform communication with the gateway 9 via the routing device 8, and the I/O devices 4 to 6 perform communication with the gateway 9 via the routing device 7.

When the above-mentioned wireless communication is performed, in order that the presence or absence of transmission errors is identified accurately, the calculation result of an MIC (Message Integrity Code: manipulation detection code) based on a cipher set beforehand on the transmitting side is added and transmitted. Also on the receiving side, an MIC is calculated on the basis of a cipher key common to the transmitting side, and the result of the calculation is compared and checked with the received MIC. The presence or absence of transmission errors is then judged depending on whether the two MICs are coincident with each other.

FIG. 5 is a block diagram showing an example of a processor 20 on the receiving side, and FIG. 6 is a flowchart illustrating an example of the flow of MIC processing at the time when data is received in the processor 20 on the receiving side shown in FIG. 5. Referring to FIGS. 5 and 6, when a data receiver 21 receives data transmitted from the transmitting side (at step S1), an MIC detector 22 detects the MIC that was calculated and added to the data on the transmitting side (at step S2), and an MIC calculator 23 calculates an MIC on the basis of the cipher key common to the transmitting side (at step S3).

An MIC comparator 24 compares and checks the MIC detected by the MIC detector 22 with the MIC calculated by the MIC calculator 23, thereby judging whether the two are coincident with each other (at step S4).

In the case that the two are coincident with each other, the MIC calculated by the MIC calculator 23 is added to an acknowledge signal ACK generated by an ACK generator 25 and then transmitted to the transmitting side via a data transmitter 26 (at step S5).

On the other hand, in the case that the two are not coincident with each other, the MIC calculated by the MIC calculator 23 is added to a non-acknowledge signal NACK generated by an NACK generator 27 and then transmitted to the transmitting side via the data transmitter 26 (at step S6).

Non-patent Document 1 discloses a concept of a field wireless solution conforming to ISA100.11a and a concept of a field wireless system in which a central focus is placed on DCS.

Non-patent Document 2 discloses a technology relating to wireless field devices and a field wireless system conforming to ISA100.11a.

Patent Document 1 discloses a technology for preventing terminals from malfunctioning even in the case that a communication network is structured so that old terminals operating according to an old protocol existing already are mixed with new terminals adopting a new protocol that is made by modifying the old protocol.

PRIOR ART DOCUMENT

Non-Patent Document

[Non-patent Document 1] "Field Wireless Solution Based on ISA100.11a to Innovate Instrumentation," prepared by Shuji Yamamoto and other two, Yokogawa Technical Report, Yokogawa Electric Corporation, 2010, Vol. 53, No. 2 (2010), p. 7 to p. 12

[Non-patent Document 2] "World's First Wireless Field Instruments Based on ISA100.11a," prepared by Shuji Yamamoto and other three, Yokogawa Technical Report, Yokogawa Electric Corporation, 2010, Vol. 53, No. 2 (2010), p. 13 to p. 16

Patent Document

[Patent Document 1] JP-A-2008-154087

The above-mentioned wireless communication standard has been reviewed and revised as appropriate so as to be able to cope with technological advances and environmental changes, for example.

As a result, it is conceivable in some cases that a wireless field device having been used from the beginning of the use of an existing process control system operates on the basis of the initial standard version ISA100.11a-2009, for example, but a wireless field device newly added to the existing process control system operates on the basis of the revised standard version ISA100.11a-2011 that is being revised.

In incompatible and different standards, such as the initial standard version ISA100.11a-2009 and the revised standard version ISA100.11a-2011, the standards are different from each other in the following points:

a) different in the parameter that is used for MIC calculation b) different in the parameter ID (Attribute ID) required when making an access to the parameter possessed by a field device c) different in the data structure of the parameter possessed by a field device Hence, field devices operating on the basis of the different standards cannot be mixedly connected.

In this case, this can be solved by changing the firmware of all the existing field devices so that the devices operate on the basis of the revised standard ISA100.11a-2011. However, enormous cost is necessary to change the firmware of all the wireless field devices having been used from the beginning of the use of the existing process control system.

Accordingly, it is desired that field devices operating on the basis of an existing standard and field devices operating on the basis of a revised new standard can be mixed in a process control system.

SUMMARY

Exemplary embodiments of the invention provide a wireless network system in which devices operating on the basis of an existing standard and devices operating on the basis of a revised new standard can be operated.

A wireless network system according to an exemplary embodiment comprises:

a plurality of devices operating on the basis of incompatible and different standards, wherein at least one of the devices comprises a standard identifying module configured to identify standards on the basis of parameters inherent and different in the respective standards.

The standard identifying module may be configured to identify the standard on the basis of a calculation result of a manipulation detection code.

The incompatible and different standards may correspond to the old version and the new version of the industrial automation wireless communication standard ISA100.11a.

Consequently, the plurality of devices operating on the basis of the incompatible and different standards and mixedly connected to the same wireless network system can operate on the basis of the standards respectively identified.

More specifically, in the case that field devices operating on the basis of a revised new standard are provided with, for example, a manipulation detection code calculation function operating on the basis of both the existing standard and the revised new standard, the devices operating on the basis of the existing standard can be mixed with the devices operating on the basis of the revised new standard in the same wireless network system.

BRIEF DESCRIPTION OF THE DRAWINGS

FIGS. 3A to 3C are data structure diagrams on the basis of an industrial automation wireless communication standard ISA100.11a.

DETAILED DESCRIPTION

Figure 1:
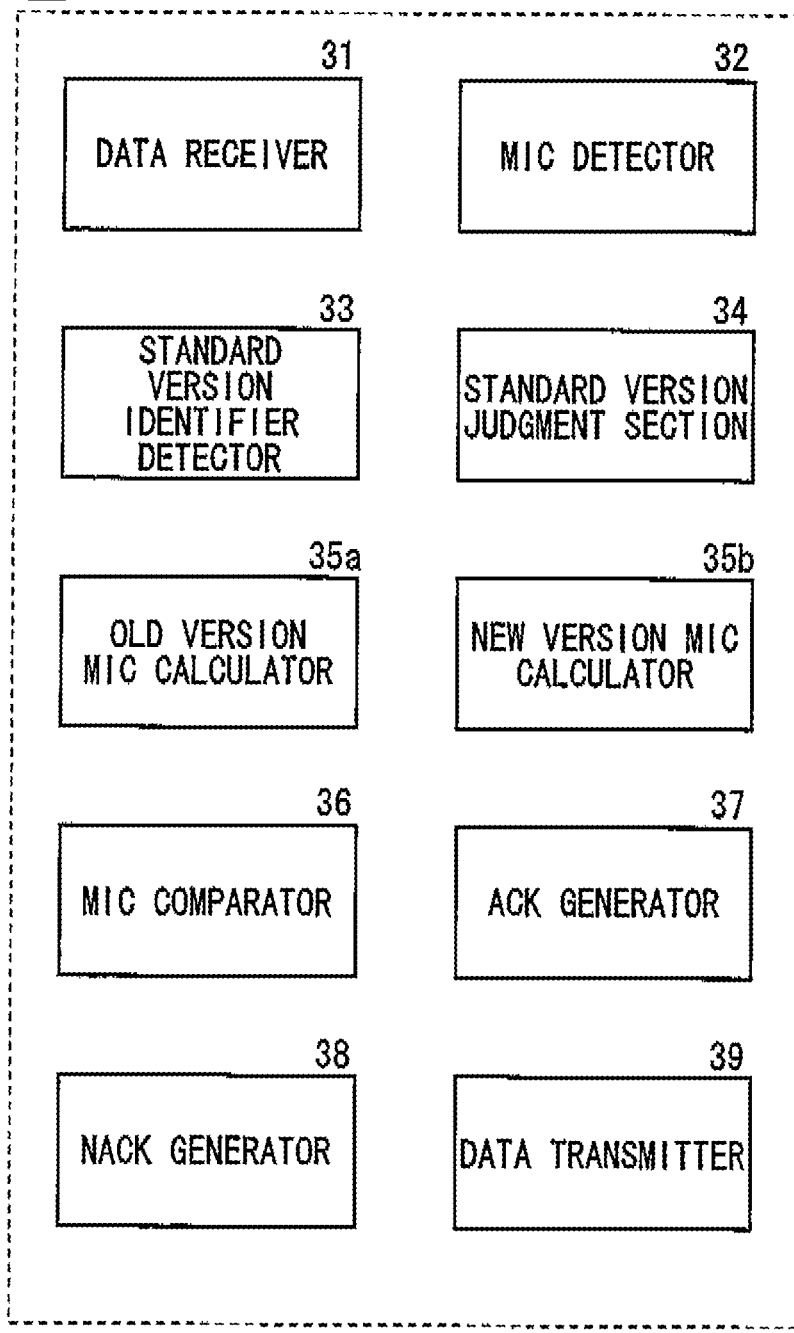
FIG. 1 is a block diagram showing a processor 30 on a receiving side in a device operating on a new version standard according to an exemplary embodiment of the present invention.
Figure 2:
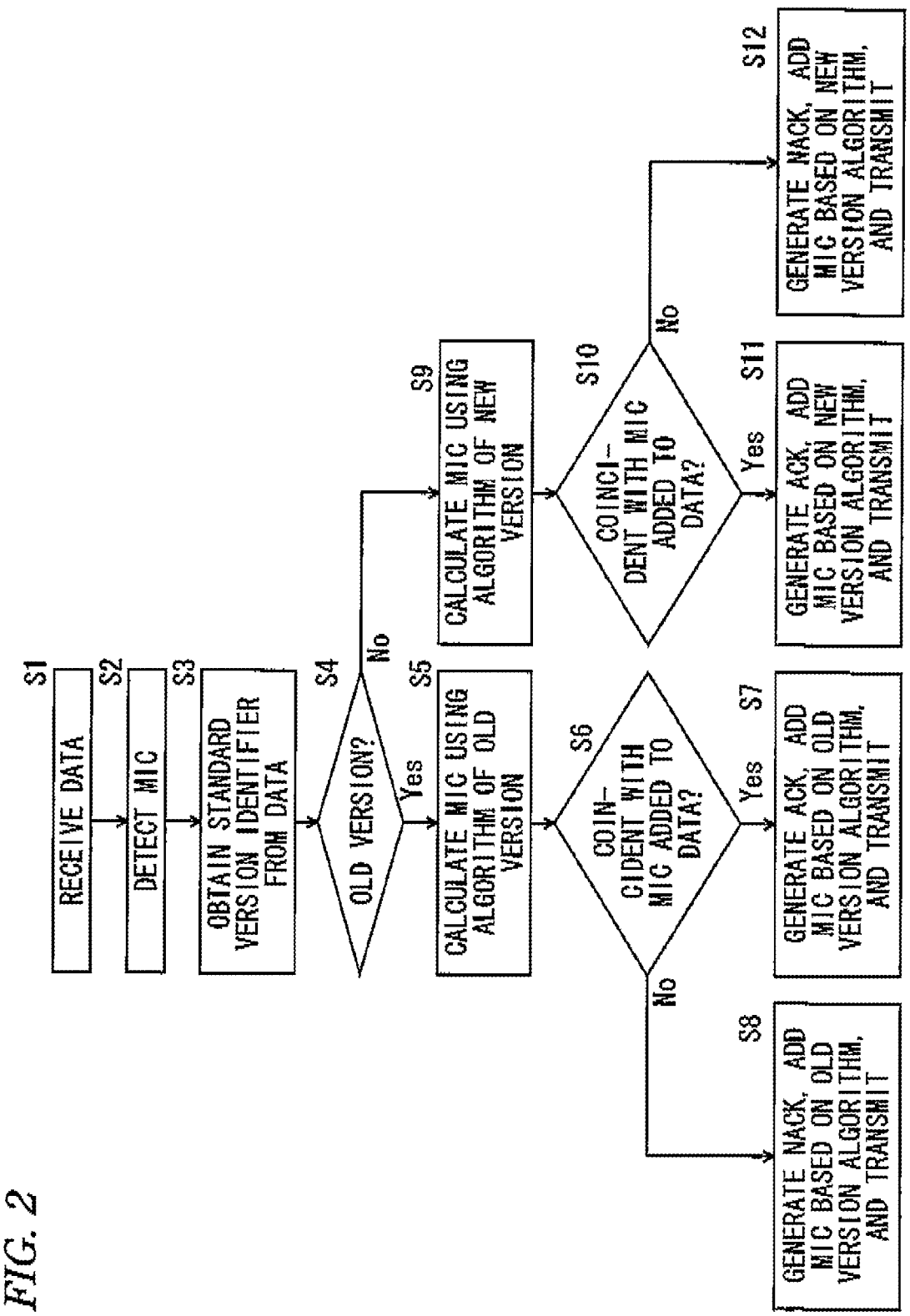
FIG. 2 is a flowchart illustrating a flow of MIC processing at the time when data is received in the processor 30 shown in FIG. 1.
Figure 4:
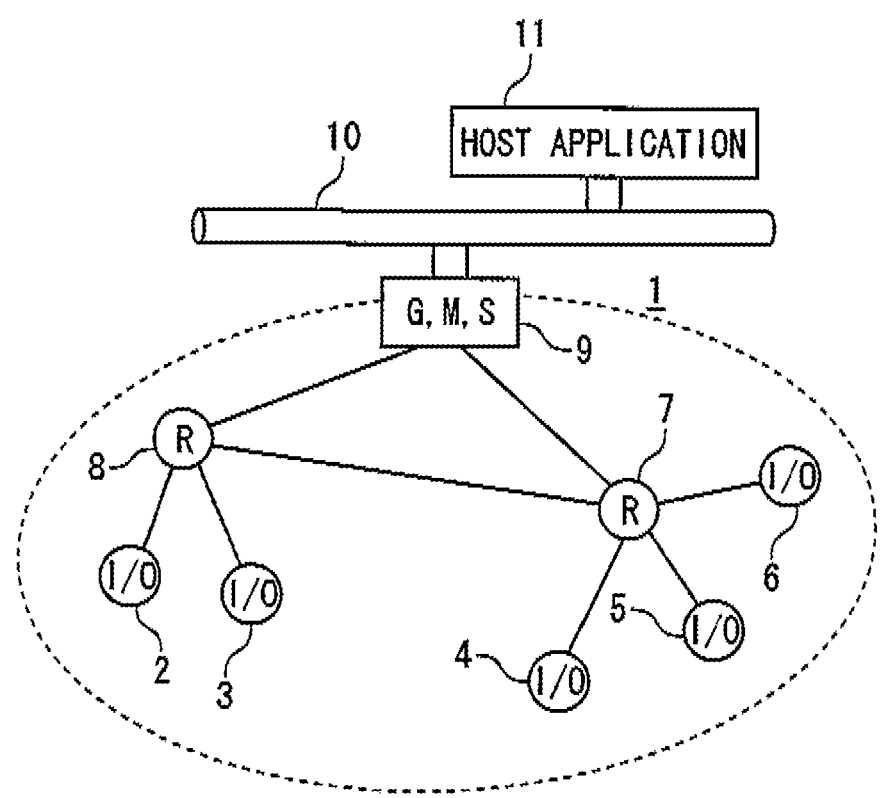
FIG. 4 is a configuration explanatory view showing a wireless network system in the related art.
Figure 5:
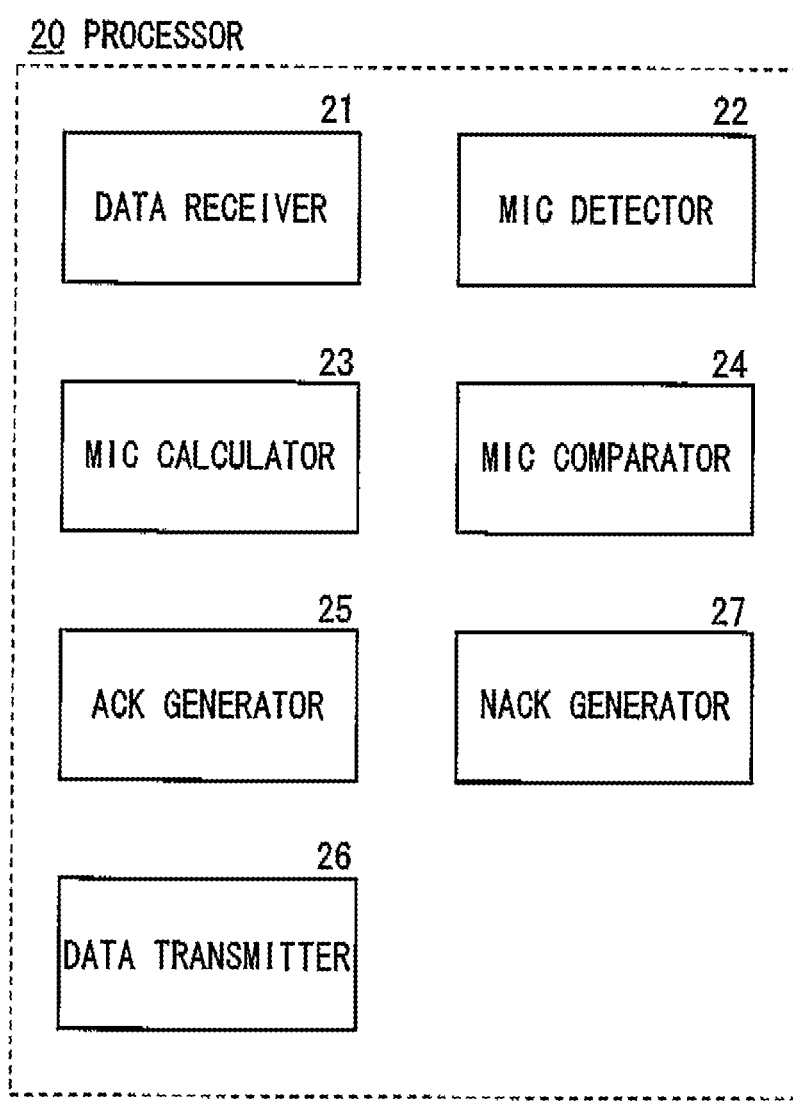
FIG. 5 is a block diagram showing a processor 20 on the receiving side in the related art.
Figure 6:
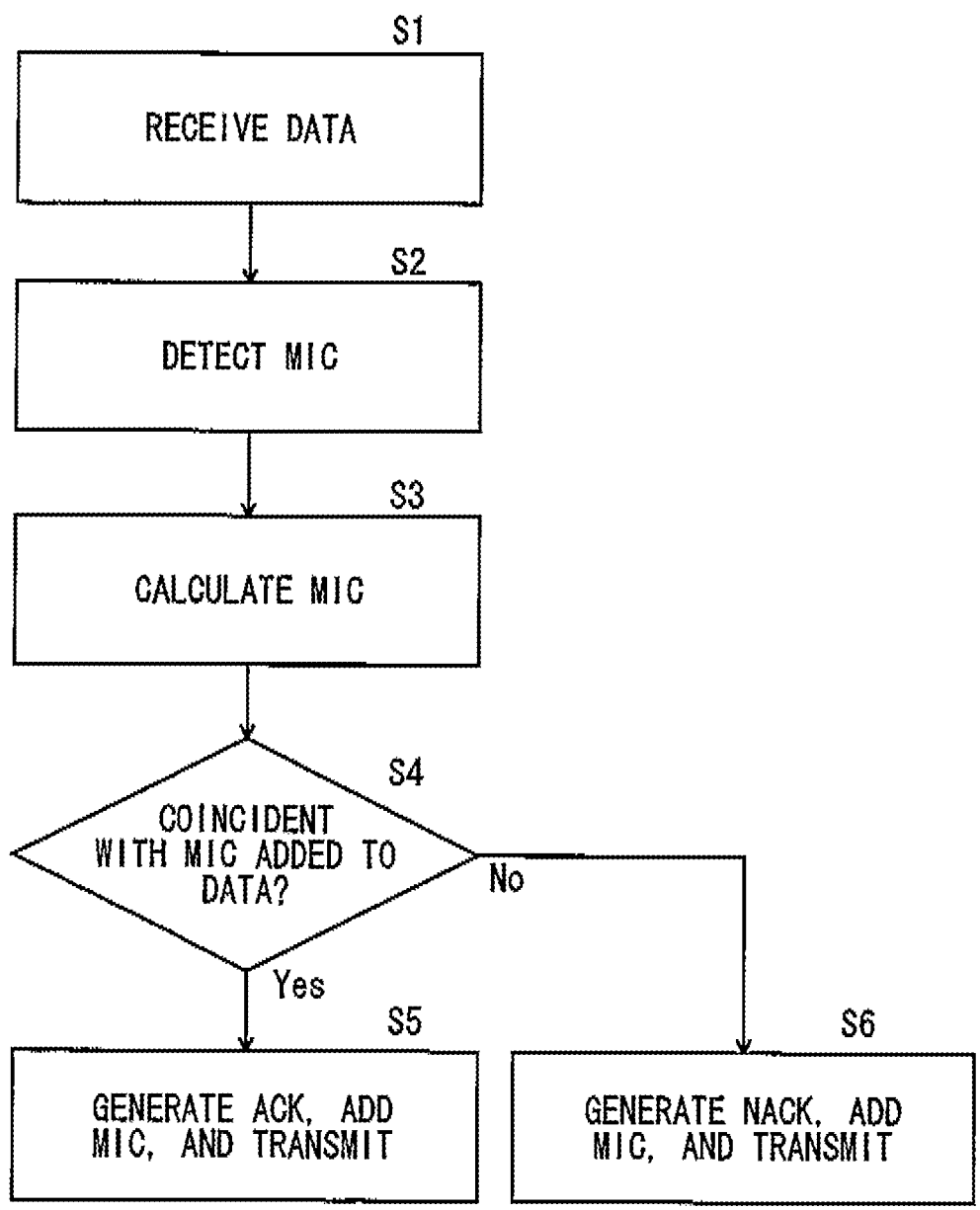
FIG. 6 is a flowchart illustrating a flow of MIC processing at the time when data is received in the processor 20 shown in FIG. 5.

An embodiment access to the present invention will be described below in detail using the drawings. FIG. 1 is a block diagram showing an example of a processor 30 on the receiving side in a device operating on a new version standard and to be used in the present invention. FIG. 2 is a flowchart illustrating an example of the flow of MIC processing at the time when data is received in the processor 30 on the receiving side shown in FIG. 1. FIGS. 3A to 3C are data structures diagrams on the basis of the industrial automation wireless communication standard ISA100.11a. The processor 30 on the receiving side in the device operating on the basis of the new version standard and to be used in the present invention is provided with both an old version MIC calculator 35a and a new version MIC calculator 35b.

Referring to FIGS. 1 and 2, when a data receiver 31 receives data transmitted from the transmitting side (at step S1), an MIC detector 32 detects the MIC that was calculated and added to the data on the transmitting side (at step S2).

On the other hand, from the structure of the data shown in FIG. 3A and received by the data receiver 21, a standard version identifier detector 33 detects the identifier representing the version of the wireless communication standard on the basis of which the received data is generated (at step S3). On the basis of the identifier detected by the standard version identifier detector 33, a standard version judgment section 34 judges whether the version of the standard is old (at step S4).

FIG. 3A is a view showing the structure of a data frame DPDU (Datalink Protocol Data Unit) to be transmitted and received between devices at the DL levels (datalink layer levels) thereof. FIG. 3B is a view showing the structure of the DHDR frame of the revised standard version ISA100.11a-2011, and FIG. 3C is a view showing the structure of the DHDR frame of the initial standard version ISA100.11a-2009.

Targets to be authenticated by DMIC are MICR, DHR and DSDU (DL Service Unit) as shown in FIG. 3A. DHR is the header of DPDU and is composed of DHDR, DMXHR, DAUX, DROUT and DADOR.

The identifier of the standard version (DL Version) of the industrial automation wireless communication standard ISA100.11a is included in the frame of DHDR. In other words, the value of the revised standard version ISA100.11a-2011 is "01" as shown in FIG. 3B, and the value of the initial standard version ISA100.11a-2009 is "00" as shown in FIG. 3C.

Referring again to FIGS. 1 and 2, in the case that the standard version judgment section 34 judges that the version is old, the old version MIC calculator 35*a* calculates an MIC on the basis of the algorithm of the old version including a cipher key common to the transmitting side (at step S5).

An MIC comparator 36 compares and checks the MIC detected by the MIC detector 32 with the MIC calculated by the old version MIC calculator 35*a*, thereby judging whether the two are coincident with each other (at step S6).

In the case that the two are coincident with each other, the MIC calculated by the old version MIC calculator 35*a* is added to an acknowledge signal ACK generated by an ACK generator 37 and then transmitted to the transmitting side via a data transmitter 39 (at step S7).

On the other hand, in the case that the two are not coincident with each other, the MIC calculated by the old version MIC calculator 35*a* is added to a non-acknowledge signal NACK generated by an NACK generator 38 and then transmitted to the transmitting side via the data transmitter 39 (at step S8).

In contrast, in the case that the standard version judgment section 34 judges that the version is new, the new version MIC calculator 35*b* calculates an MIC on the basis of the algorithm of the new version including a cipher key common to the transmitting side (at step S9).

The MIC comparator 36 compares and checks the MIC detected by the MIC detector 32 with the MIC calculated by the new version MIC calculator 35*b*, thereby judging whether the two are coincident with each other (at step S10).

In the case that the two are coincident with each other, the MIC calculated by the new version MIC calculator 35*b* is added to an acknowledge signal ACK generated by the ACK generator 37 and then transmitted to the transmitting side via the data transmitter 39 (at step S11).

On the other hand, in the case that the two are not coincident with each other, the MIC calculated by the new version MIC calculator 35*b* is added to a non-acknowledge signal NACK generated by the NACK generator 38 and then transmitted to the transmitting side via the data transmitter 39 (at step S12).

With this configuration, the devices operating on the basis of the existing standard can be mixed with the devices operating on the revised new standard in the same wireless network system.

In the above-mentioned embodiment, the standard version (DL version) identifier is used as means for identifying the version of the standard when the MIC calculation processing is performed. However, in the case that, for example, a numerical value in data is different depending on the standard, it is not limited to use the standard version identifier, but either may be used.

Furthermore, in the case that transmission is performed by a communication partner from an device conforming to a new standard and if the version of the standard is unknown, it may be possible to judge the version of the standard used by the communication partner on the basis of ACK/NACK retuned from the communication partner after the transmission of the result of the calculation on the basis of the MIC algorithm of either one of the versions of the standard. After the judgment, it may be possible that the pair of the identifier of the device and the version of the standard is stored, that the predetermined version of the standard is selected depending on the identifier of the device, and that an MIC is calculated on the basis of the algorithm of the selected version.

Moreover, in the case that Attribute ID is determined when an access is made to a parameter having Attribute ID being different depending on the version of the standard, it may be possible to use the version identification method used in the MIC processing.

Still further, it may be possible that a parameter being different in each version of the standard is read beforehand and that the version of the standard is identified by the content of the response so that operation is performed accordingly.

As described above, the present invention can realize a wireless network system in which devices operating on the basis of an existing standard and devices operating on the basis of a revised new standard can operate in the same system. In particular, the present invention is effective in the case that devices operating on the basis of a new standard are used in a process control system structured by an existing wireless network system in industrial automation.

What is claimed is:

1. A wireless network system comprising:
a plurality of devices operating on the basis of incompatible and different standards,
wherein at least one of the devices comprises:
    a standard identifier detector configured to detect an identifier by reading a value from a structure of data received by the at least one device,
    a standard judgment module configured to judge a version of the standard on the basis of the identifier detected by the standard identifier detector,
    a manipulation detection code calculator configured to calculate a manipulation detection code (MIC) for the version of the standard, and
    a manipulation detection code comparator configured to compare a manipulation detection code (MIC) detected by a manipulation detection code detector and the manipulation detection code calculated by the manipulation detection code calculator, thereby judging whether the two are coincident with each other,
wherein, in the case that the standard judgment module judges that the version is old, if the manipulation detection code comparator judges that the two are coincident with each other, an old version manipulation detection code, calculated based on an algorism of the old version including a cipher key common to a transmitting side by the manipulation detection code calculator, is added to an acknowledge signal and then transmitted, and
if the manipulation detection code comparator judges that the two are not coincident with each other, the old version manipulation detection code, calculated based on the algorism of the old version including the cipher key common to the transmitting side by the manipulation detection code calculator, is added to a non-acknowledge signal and then transmitted, and
wherein, in the case that the standard judgment module judges that the version is new, if the manipulation detection code comparator judges that the two are coincident with each other, a new version manipulation detection code, calculated based on an algorism of the new version including a cipher key common to the transmitting side by the manipulation detection code calculator, is added to an acknowledge signal and then transmitted, and if the manipulation detection code comparator judges that the two are not coincident with each other, the new version manipulation detection code, calculated based on the algorism of the new version including the cipher key common to the transmitting side by the manipulation detection code calculator, is added to a non-acknowledge signal and then transmitted.

2. The wireless network system according to claim 1, wherein the incompatible and different standards correspond to the old version and the new version of the industrial automation wireless communication standard ISA100.11a.

3. The wireless network system according to claim 1, wherein the incompatible and different standards correspond to the old version and the new version of the industrial automation wireless communication standard ISA100.11a.

4. The wireless network system according to claim 1, wherein the manipulation detection code calculator is configured to calculate the manipulation detection code on the basis of an algorithm of the identified standard.

5. The wireless network system according to claim 1, wherein the value from the structure of the data is in a frame of datalink layer header (DHR).

6. The wireless network system according to claim 1, wherein the value from the structure of the data is in a frame of datalink layer header subheader (DHDR).

7. The wireless network system according to claim 1, wherein the value from the structure of the data is in a frame comprising identifying a datalink layer (DL) Version.

* * * * *